(12) United States Patent
Gronquist (10) Patent No.: US 7,472,476 B2
(45) Date of Patent: Jan. 6, 2009

(54) METHOD OF APPLYING JOINT INFILL CLADDING TO PIPE

(75) Inventor: Guy Gronquist, Katy, TX (US)

(73) Assignee: Offshore Joint Services, Inc., Katy, TX (US)

(*) Notice: Subject to any disclaimer, the term of this patent is extended or adjusted under 35 U.S.C. 154(b) by 490 days.

(21) Appl. No.: 11/231,558

(22) Filed: Sep. 21, 2005

(65) Prior Publication Data

US 2007/0063509 A1    Mar. 22, 2007

(51) Int. Cl.
*H01R 43/00* (2006.01)
*F16L 55/16* (2006.01)
*F16L 13/02* (2006.01)
*B32B 37/00* (2006.01)

(52) U.S. Cl. .................. 29/825; 138/99; 156/275.1; 285/21.1; 285/21.2

(58) Field of Classification Search ............... 29/825; 138/99; 156/275.1; 285/21.1, 21.2
See application file for complete search history.

(56) References Cited

U.S. PATENT DOCUMENTS

| | | | | |
|---|---|---|---|---|
| 1,940,729 A * | 12/1933 | Pfefferle | | 285/337 |
| 2,816,323 A | 12/1957 | Munger | | |
| 2,937,662 A | 5/1960 | Green | | |
| 3,446,909 A * | 5/1969 | Kahn | | 174/71 R |
| 4,054,158 A | 10/1977 | Hoeman et al. | | |
| 4,096,017 A * | 6/1978 | Wyke et al. | | 156/274.2 |
| 4,111,017 A | 9/1978 | Wells et al. | | |
| 4,111,234 A * | 9/1978 | Wells et al. | | 138/99 |
| 4,629,216 A * | 12/1986 | Pedersen | | 285/21.2 |
| 4,909,669 A | 3/1990 | Baker | | |
| 5,199,464 A | 4/1993 | Savard | | |
| 5,328,648 A | 7/1994 | McBrien et al. | | |
| 5,345,972 A * | 9/1994 | Goglio et al. | | 138/99 |
| 5,364,130 A * | 11/1994 | Thalmann | | 285/21.2 |

(Continued)

*Primary Examiner*—C. J Arbes
(74) *Attorney, Agent, or Firm*—Bracewell & Giuliani LLP (57) ABSTRACT

A protective sleeve is applied as a permanent outer cladding shield over a joint infill at the welded end closure portions of adjacent coated sections of pipe for a pipeline in or beneath a body of water. The sleeve once installed forms a seal against entry of water to protect the pipe from corrosion. The sleeve takes the form of a sheet of synthetic resin mounted to form a cylinder about the area to receive the joint infill. A flap is provided on a longitudinal edge of the sheet to prevent leakage and hold the cylindrical shape of the infill when to be applied. Electrically conductive mesh or wire element bands are mounted with an inner side of the sheet to circumferentially engage the coated sections of the pipe on either side of the infill. The sheet and conductive bands are held in place to be applied by an applicator clamp. Electrical current is applied to the mesh bands to fuse the sleeve circumferentially to the coated cover sections of the pipe. The infill is applied in the interior of the sleeve. The flap is removed and a longitudinally extending strip of comparable material to the sleeve with an electrically conductive strip is positioned over a gap formed when the sleeve flap is removed. Electrical current is applied to fuse a longitudinal seam of the sleeve between the end fused portions. A cladding or seal against entry of water is formed between the sleeve and the pipe covering. A fill/vent port is formed in the sleeve and allows introduction of the joint infill. The closure is later hermetically sealed to the sleeve over the injection port by electrical heating of conductive elements mounted on a surface of the closure.

22 Claims, 7 Drawing Sheets

U.S. PATENT DOCUMENTS

| | | |
|---|---|---|
| 5,722,463 A | 3/1998 | Smyth et al. |
| 5,736,715 A | 4/1998 | Keyes |
| 5,791,378 A | 8/1998 | Stephens |
| 5,804,093 A | 9/1998 | Wyke et al. |
| 5,900,195 A | 5/1999 | Pool et al. |
| 5,947,159 A | 9/1999 | Takahashi |
| 5,950,683 A | 9/1999 | Henderson et al. |
| 5,988,689 A * | 11/1999 | Lever ........................ 285/21.1 |
| 6,059,319 A * | 5/2000 | Wyke ........................ 285/21.2 |
| 6,402,201 B1 | 6/2002 | Pool et al. |
| 6,997,260 B1 * | 2/2006 | Trader et al. ................ 166/277 |
| 7,165,579 B2 * | 1/2007 | Borland et al. ................ 138/99 |

* cited by examiner

FIG. 12

METHOD OF APPLYING JOINT INFILL CLADDING TO PIPE

CROSS-REFERENCE TO RELATED APPLICATIONS

The present application relates to joint infill cladding and method of applying same, as does commonly owned U.S. patent application Ser. No. 11/231,449 entitled "Joint Infill Cladding and Method of Applying Same", filed of even date herewith, and of which applicant is inventor.

BACKGROUND OF THE INVENTION

1. Field of the Invention

The present invention relates generally to providing water impenetrable outer cladding to pipeline coatings, and to methods and apparatus for installing same, to better protect joint infill coatings applied to exposed ends of coated pipeline to be laid in bodies of water.

2. Description of the Related Art

It is conventional in the offshore pipeline industry to use weighted coated pipe on pipelines which are being laid on or under the floors of bodies of water. Originally, the weight coatings of each section or length of pipe were of concrete with end metal closure portions of the pipe left bare or unprotected. The end closure portions of adjacent lengths of pipe were welded together on a pipe laying barge as the pipeline was being formed. The bare metal was then covered with a film or sheet of corrosion resistant material. A joint infill resulting from injection of chemicals which reacted and formed an open cell polyurethane foam was then used to fill the annular socket or space between weight coatings. U.S. Pat. Nos. 5,900,195 and 6,402,201, each commonly owned by the assignee of the present application, are examples of this open cell foam infill technology.

More recently, the pipe lengths have been weight coated with a solid synthetic resin, usually being polypropylene and polyethylene synthetic resin coatings to serve as thermal insulation. This has been increasingly the case as offshore production has moved into deeper bodies of water. In some cases a concrete weight coating has been applied on top of the synthetic resin insulation. A similar solid synthetic resin was also desired for the joint infill material. Solid synthetic resins are impenetrable by water; however, concerns have been raised about water ingress through even the relatively small spaces or gaps between the joint infill and the synthetic resin insulation coatings. This has been a particular concern due to the increased hydrostatic pressures beneath bodies of water, particularly in deeper bodies of water.

Other patents, such as U.S. Pat. No. 6,059,319, were directed to forming a cylindrical sleeve seal over the gap between adjacent lengths of plastic coated pipe. Filler panels of butyl rubber, bitumastic, rubberized bitumen or similar materials of a size approximating the interior space within the cylindrical sleeve were used in an attempt to provide corrosion protection. However, gaps and spaces were often present between the various elements, such as between the filler panel material, the pipe coating and the cylindrical sleeve seal. There was thus a risk of fluid leakage and corrosion. For offshore pipelines, particularly in deeper bodies of water, the hydrostatic pressures increased the concerns of fluid leakage through these gaps and spaces and resulting possible corrosion.

SUMMARY OF THE INVENTION

Briefly, the present invention provides a new and improved protective outer cladding for coated pipelines being laid in a body of water, and a method of applying a protective outer cladding over welded end portions of adjacent coated sections of pipe for such a pipeline. A sheet of synthetic resin with spaced electrically conductive elements is applied to form a cylindrical sleeve about the welded end portion, with the conductive elements being positioned circumferentially about the coated end portions. The electrically conductive elements are connected to a source of electrical current. Electrical current is sent into the electrically conductive elements to head adjacent portions of the cylindrical sleeve to bond the sleeve together with the weight coating and to seal the sleeve over the joint infill coating. One or more chemicals or components are introduced into the interior of the cylindrical sleeve to allow a synthetic resin to form and fill the interior of the sleeve as joint infill insulation between the adjacent pipe sections. The present invention also provides a new and improved cladding applicator clamp to maintain the protective outer cladding in place as it is being applied over joint infill on coated pipe sections for a pipeline. The coated sections may include insulation coating and weight coating.

The weight-coated portions of the pipeline in a preferred embodiment are coated with a synthetic resin weight coating, and the synthetic resin formed during the step of introducing components is preferably a solid polyurethane which bonds with the synthetic resin coating along the length of the pipe.

To better understand the characteristics of the invention, the description herein is attached, as an integral part of the same, with drawings to illustrate, but not limited to that, described as follows.

BRIEF DESCRIPTION OF THE DRAWINGS

A better understanding of the present invention can be obtained when the detailed description set forth below is reviewed in conjunction with the accompanying drawings, in which.

To better understand the invention, a detailed description of some of the modalities, as shown in the drawings for illustrative but not limiting purposes, is included as part of the description herein.

DETAILED DESCRIPTION OF THE PREFERRED EMBODIMENTS

Although the following detailed description contains many specific details for purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations thereon, the claimed invention.

Figure 1:
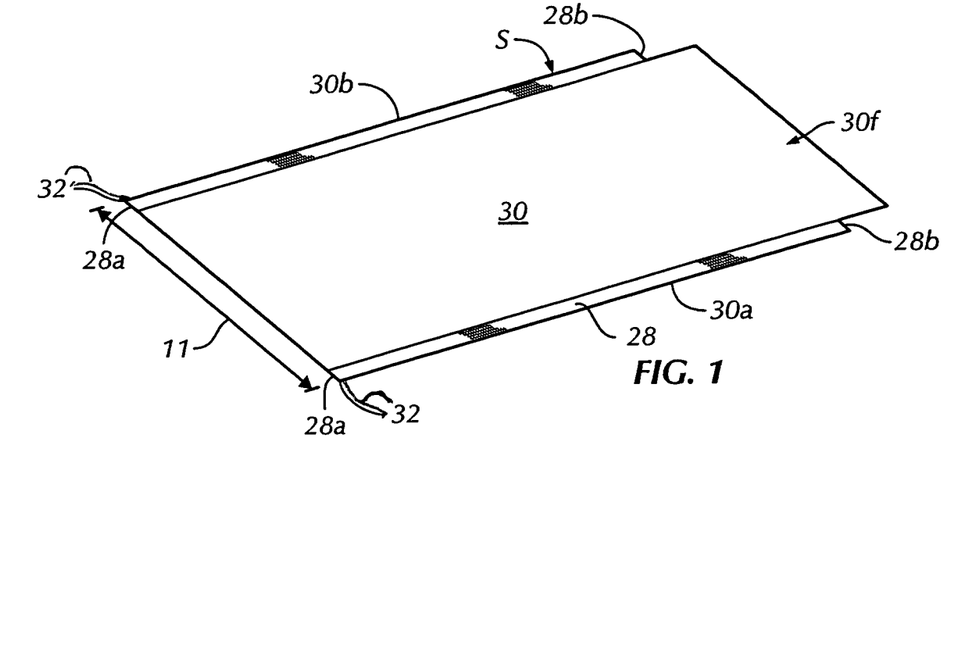
FIG. 1 is an isometric view of a joint infill cover sleeve with an electrical heating/welding element according to the present invention.
Figure 3:
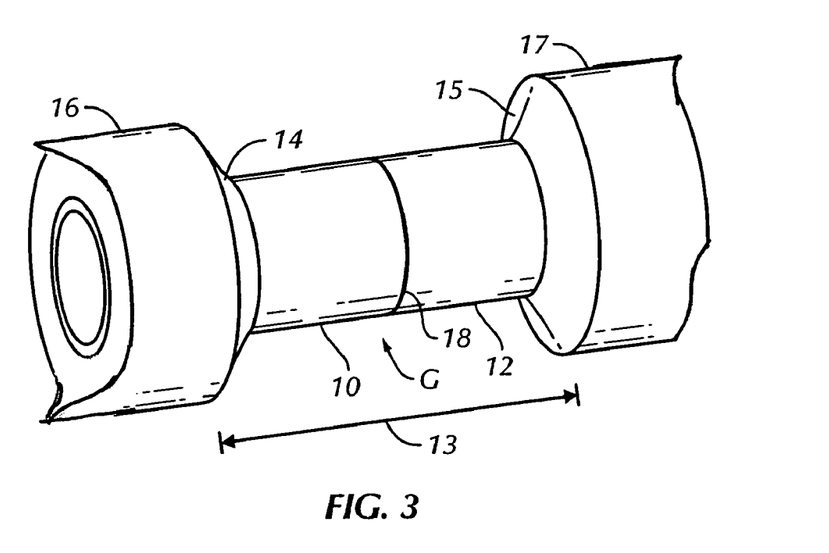
FIG. 3 is an isometric view of a pipe joint before application of the joint infill cover sleeve of FIG. 1.

In the drawings, FIG. 1 shows a flat rectangular sheet S formed of a suitable synthetic resin, such as polypropylene or polyethylene which is wrapped into a cylindrical sleeve in order to be applied as protective cladding in connection with joint infill on coated sections of a pipeline. The synthetic resin material of the sleeve S has a typical thickness from about 0.125" to 0.5" or larger. The dimensions of the sheet S are such that it extends as indicated at 11 laterally a sufficient distance to span a gap G (FIG. 3) at welded end portions 10 and 12 of the pipeline P. The welded end portions or stubs 10 and 12 are located between coatings 14 and 15 which form selected coated sections 16 and 17 of the pipeline P. The dimensions of the sheet S are also such that it extends laterally or transversely as indicated at 13 a sufficient distance to circumferentially enclose the gap G (FIGS. 3 and 4) with adequate overlap of portions of the wrapped sheet S to allow forming a protective cladding for sealing against water ingress according to the present invention.

According to the present invention, sheet S is wrapped about the pipeline P to form a cylindrical sleeve C (FIG. 4) which is a protective outer cladding shield over a weld joint 18 formed between the welded end portions 10 and 12 adjacent the coated pipe sections 16 and 17 of the pipeline P. The coatings 14 and 15 applied to the pipeline are a suitable, fluid impenetrable, hard, high-density synthetic resin such as a high-density polypropylene or polyethylene, also known as HDPP or HDPE, respectively. It should be understood that, if described, a number of other water impenetrable resins may be used in place of HDPP or HDPE. The coatings 14 and 15 are factory applied and serve to provide thermal insulation for the fluids transported through the pipeline. If desired, an outer weight coating of concrete may be applied as a weight coating as a part of coatings 14 and 15 on top of the thermal insulative HDPE or HDPP.

As is conventional, the end portions 10 and 12 of the pipe sections 16 and 17 are welded together to form the weld joint 18. The exposed end or stub portions 10 and 12 of the pipe sections 16 and 17, respectively, in the area of the gap G are not weight coated prior to the welding of sections 10 and 12 together. If desired, a thin corrosion protective coating may be installed over the end portions 10 and 12 after the weld joint 18 is formed and the weld area and end portions cleaned.

As will be set forth below, the sheet S is formed into the cylindrical sleeve C, and then an annulus or cylindrical space 24 is formed about the exposed pipe sections 10 and 12 adjacent the weld joint 18. The annulus 24 is preferably filled such as by pouring, injection or the like with a chemical composition such as a suitable synthetic resin, in the form of a polyurethane or epoxy which sets or hardens in the annulus to form a HDPE or other hard synthetic resin infill I. As an alternative, chemical components which mix and then harden to form a hard polyurethane or epoxy joint infill I for insulation may be injected into the annulus 24. The composition or components which form the joint infill I also bond with the adjacent weight coatings 14 and 15 of the pipeline P and also with synthetic resin interior surface portions 30 of the sleeve S for circumferential positioning (FIG. 4) on coated sections 16 and 17 on each side of the welded end portions 10 and 12 of the pipeline P. Due to such bonding, no flow path for water ingress is formed between the end portions 10 and 12 adjacent weld joint in the pipeline P.

As shown in FIG. 1, a set of electrically conductive elements strips or bands 28 of a welding element/mesh are located at side edges 30a, 30b of the sheet S. The welding elements 28 are pre-attached, such as by means of tack welding, to locations on the side edges 30a, 30b on the interior surface 30 of the sheet S. The welding elements 28 are formed of a suitable conductive metallic material, such as a number of alloys including stainless steel, nickel-chromium, aluminum, copper, copper-tin, or other electrically conductive material. It should be understood that the foregoing materials for the welding element 28 are given by way of example, and that others may be used, if desired.

The welding elements 28 in response to the flow of electrical current heat and melt the adjacent synthetic resin materials. The heated, melted synthetic resin bonds overlapping or adjacent portions of the cylindrical sleeve C together and also to the weight coatings 16 and 17. Side edge portions 30a and 30b of the sleeve C are disposed circumferentially at opposite sides spaced from each other. When the sleeve S is formed into the cylindrical sleeve C and heated by welding elements 28, the end or edge portions 30a and 30b provide circumferential bonding together of the coiled cylindrical portions of the sheet S at each end of the annulus 24. The circumferential end portions 30a and 30b also bond the sleeve C circumferentially to the coated portions 16 and 17, respectively.

A flap 30f is formed along one of the longitudinally extending side edges 30e of the sleeve C. The flap 30f forms a longitudinal temporary cover along an area of a longitudinal seam 31 along the longitudinally extending side edge portion 30e when the sheet S if wrapped about the coated portions 16 and 17 to form the cylindrical sleeve C.

Electrically conductive contacts or leads 32 and 34 are installed or attached at opposite ends 28a and 28b of each conductive strip or band 28 to connect the band 28 to a suitable power supply so that electrical current may be provided from the power supply to the conductive strip welding element or band 28. The end portions 28a and 28b of each conductive strip 28 are located so that when the sheet S is wrapped on the pipeline and the cylindrical sleeve C is formed; such end portions are spaced from each other on opposite sides of the longitudinal seam 31.

In some instances, the electrical conductive leads 32 and 34 are formed to be connected with the conductive strip or band as part thereof as shown in FIG. 1. As an alternative removable conductive probes or contacts separately insertable and removable may be used. In this manner, the synthetic resin bonds or welds formed when elements 28 heat due to electrical current flow are each a circumferential synthetic resin bond from one end 28a to the other end 28b of the elements 28.

Sizes of the sleeve C can vary to accommodate pipe sizes for example, 2" thru 60" diameters. The sleeve C in most cases is preferably pre-abraded on the inside surface 30. If desired, it may be factory corona-treated, or treated in the field by means of flame treatment, or both, to enhance the bond at the interface of the inside of the sleeve C with the solid polyurethane infill I that is formed in the annulus 24.

Figure 2:
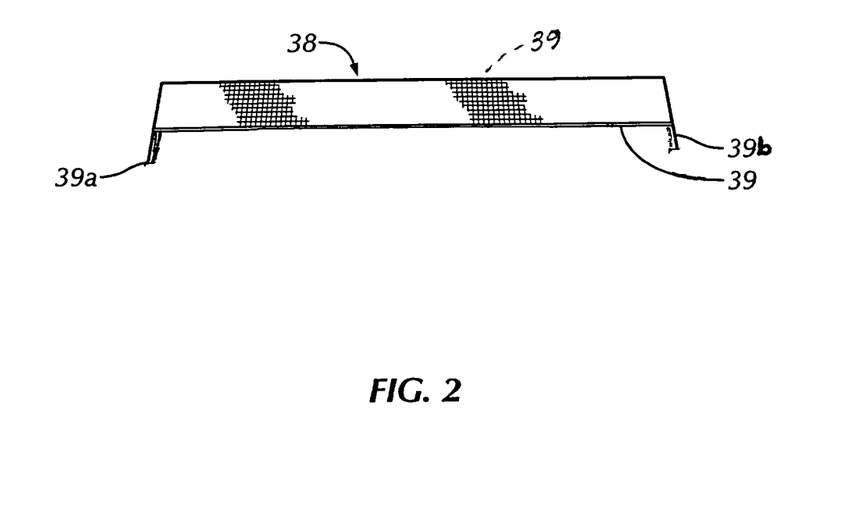
FIG. 2 is an isometric view of a seam sealing strip according to the present invention.

FIG. 2 of the drawings shows alternate forms of a synthetic resin seam sealing strip 38 provided according to the present invention to seal the longitudinal shown at 31 and along its longitudinal extent, as will be set forth below. The strip 38 is formed of a like or comparable synthetic resin to the sheet S and has an electrically conductive strip or band 39 therewith along a contact surface 38a. The conductive strip 39 is of a like or comparable structure and material to the welding element 28. As is the case with welding element 28, conductive strip 39 may have electrically conductive bands or contacts 39a and 39b formed as part thereof. Alternatively, removable conductive probes or contacts 40 which are separately insertable and removable may be used to provide current to the conductive strip 39.

Figure 5:
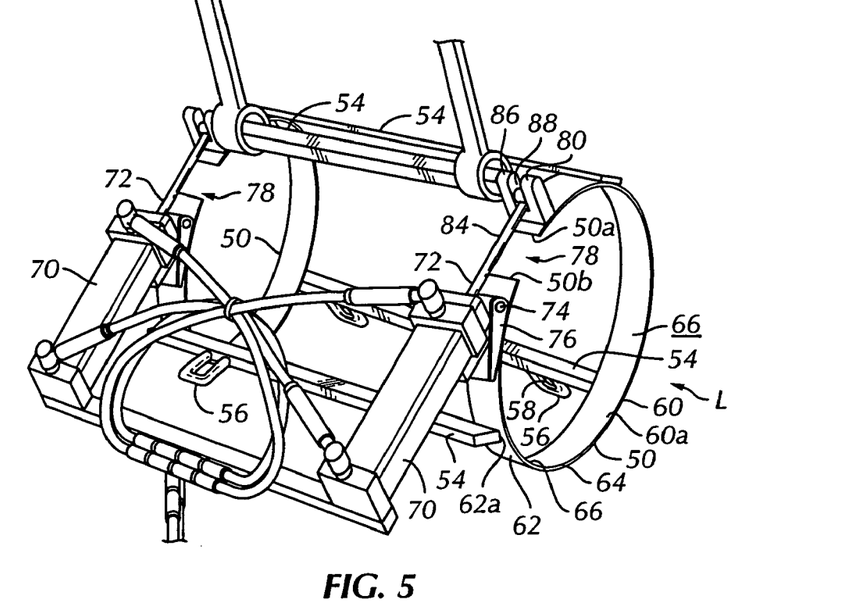
FIG. 5 is an isometric view of a cladding applicator clamp according to the present invention.

A cladding applicator clamp L (FIGS. 5 and 6) is also provided according to the present invention to maintain the protective cladding sleeve C firmly in position on the pipeline P as the protective cladding sleeve C is being applied to the pipe joint. The cladding applicator clamp L include side clamp bands 50 located at laterally spaced positions from each other and connected together by a suitable number of connector bars or beams 54. One or more of the connector bars 54 has attachment lugs or flanges 56 formed thereon at suitable locations. Connector eyelets 58 are formed in the attachment lugs 56 so that chains or other suitable forms of lifting and moving mechanisms may be inserted and connected to move the applicator clamp L into position during placement of the protective cladding sleeve C onto the pipe joint to receive the water impermeable infill.

The side clamp bands 50 are formed of a set of arcuate clamp segments 60 and 62 which are pivotally connected together by hinge pins 64 for relative movement to fit the clamp L about the pipeline P adjacent the pipe joint to receive the cladding sleeve C. The arcuate clamp segments 60 and 62 allow the applicator clamp L to be fitted over a range of diameters of coated pipe. Grip pads 66 of a suitable insulative, heat-resistant resilient material are mounted along inner surfaces 60a and 62a of the accurate clamp segments 60 and 62, respectively. The grip pads 66 fit over and engage the cladding sleeve C at each side portion over the conductive heating elements 28.

Reversible, fluid-powered pistons 70 are pivotally mounted at their inner ends 72 by pivotal connections 74 mounted with mounting flanges 76. The pistons 70 may also be electrically driven, if desired. Each of the pistons 70 is mounted on one of the side clamp bands 50 adjacent a gap 78 between end portions 50a and 50b of the side clamps 50 to allow the applicator clamp L to be brought into position and fitted over the pipeline P for installation of the protective cladding sleeve C.

A connector ball or head 80 is formed at an outer end 82 of a piston shaft 84 extending outwardly from each of the power pistons 70. The piston shafts 84 and connector balls 80 are reciprocally movable under power from the pistons 70.

Socket plates or blocks 86 are mounted on the clamp bands 50 on opposite sides of the gap 78. Each of the socket plates has an engagement socket 88 with an internal surface matching the shape of the connector heads 80 to receive and engage one of the connector heads 80 on the piston shafts 84. When the connector heads 80 are spherical or globe-shaped as shown, the sockets 88 are correspondingly spherically shaped.

The pistons 70 move the piston shafts 84 outwardly so that the connector heads 80 may be fitted into the connector sockets 88 and position the applicator clamp L on the pipeline P firmly in place enclosing over and tightly engaging the protective cladding sleeve C therein. Preferably, a release pad or liner sheet 90 (FIG. 6) is preferably applied and positioned over the cladding sleeve C enclosing the cladding sleeve C within its extent between the clamp bands 50. The pistons 70 then move the shafts 84 and connector heads 80 in an opposite direction to close the side clamp bands 50 together firmly in place over and tightly engaging the cladding sleeve C and the release pad 90 on the pipeline P. A suitable number of releasable belts 92 (FIG. 6) may also be fitted over the release pad 90 and cladding sleeve C between the side clamp bands 50 for additional holding strength and support.

Figure 4:
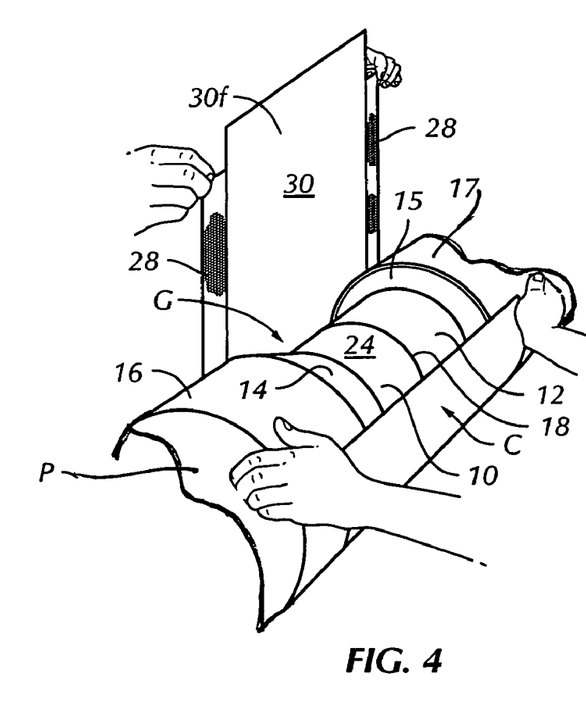
FIG. 4 is a view of the sleeve of FIG. 1 being applied to the pipe joint of FIG. 3.

FIG. 4 illustrates initial parts of the joint infill protective sleeve application process of the present invention. The sheet S is applied by hand as shown, or by machine to the field joint configuration of the pipeline P in a cylindrical wrap manner to the coated pipe sections 16 and 17. Electrical connection is then made in the manner described above to make contact with each of the welding elements 28. Typically, coatings 14 and 15 are either polypropylene or polyethylene. However, it should be understood that other suitable strength and density synthetic resin may be used as factory pipeline coatings 14 and 15. The sleeve S is preferably also manufactured of the same or very similar synthetic resin material as the factory coatings 14 and 15 on the pipeline.

Figure 6:
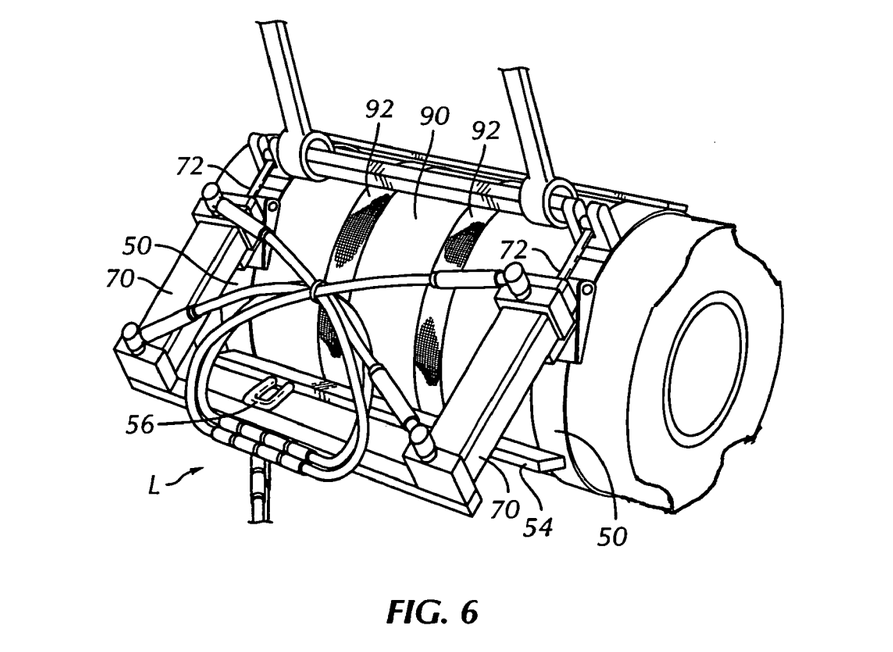
FIG. 6 is an isometric view of the applicator clamp of FIG. 5 in place over the joint infill sleeve and pipe of FIG. 4.

FIG. 6 shows the cylindrical sleeve C secured in place using cladding applicator clamp L. As mentioned, the circumferential separate clamp bands 50 are placed directly on top of the areas of the sleeve C to be circumferentially welded to the factory coatings 14 and 15.

Figure 7:
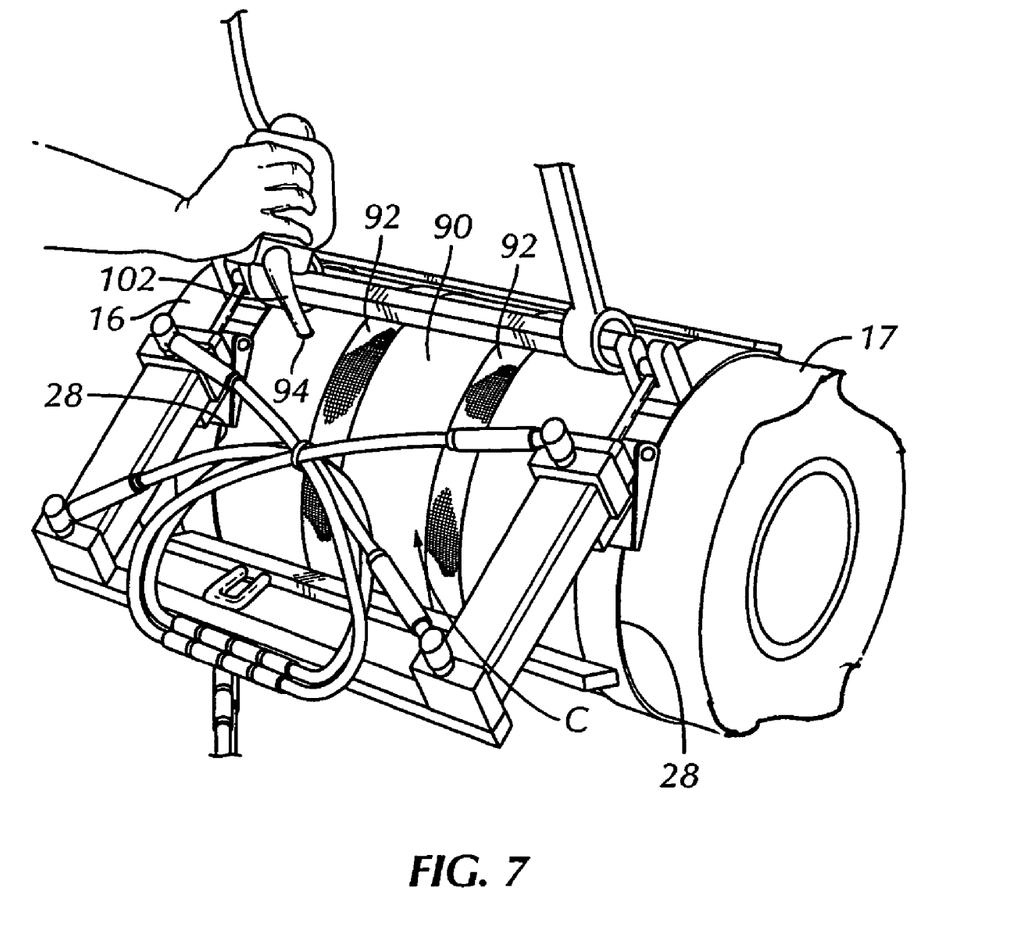
FIG. 7 is a view of joint infill material being injected within a port in the sleeve of FIG. 6.

FIG. 7 shows an injection port or filling/vent port 94 which is drilled or otherwise formed in the sleeve C, for example at the job site. In FIG. 7, the port 94 is shown as located in the top center of the sleeve C just next to the cutback or edge of the factory applied weight coating 16 or 17 at a high or uppermost location on the circumference of the weight coating. It should be understood that the injection or infill inlet port 94 may be located at other positions on the sleeve C, if desired. For example, in some situations it may be desirable to locate the port 94 at the bottom center or other lower position of the sleeve C. An example of this type could be when the infill is an elastomer being infilled into the annulus 24 from a bottom or lower position. As an alternative feature, the injection port 94 may be pre-formed in the sheet S at a suitable location before delivery to the job site. It is also possible in some cases for the annulus 24 to be filled from the bottom through a pre-drilled and/or threaded injection port at the bottom of the cylindrical sleeve C.

A solid polyurethane-forming material 100 is pumped or poured through the port 94 into the annulus 24 with a hose and nozzle 102 until the volume of the annulus 24 is full. The solid polyurethane material 100 quickly reacts and changes state from liquid to solid, hardening and forming the fluid impenetrable joint infill I. In most cases the polyurethane material 100 used has no expansion on exposure to air. However, in some cases the infill material 100 may be of a lower density that does expand somewhat. The polyurethane materials used for this application may range in density from 2 to 80 pounds per cubic foot.

Figure 8:
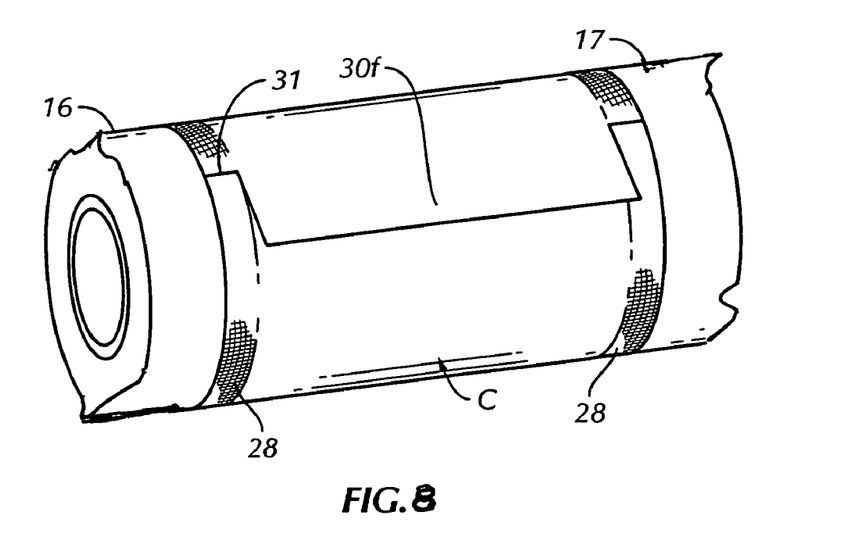
FIG. 8 is an isometric view of a joint infill sleeve according to FIGS. 6 and 7 after the joint infill has been applied.

As shown in FIG. 8, after injection of the solid polyurethane 100 to form the joint infill I, the applicator clamp L has been released from engagement with the pipe joint after the infill material 100 has been put into the annulus 24 to form the joint infill I. The flap 30f is still present with the cladding sleeve C over the longitudinal seam 31. The flap 30f is then cut off or otherwise removed.

Figure 9:
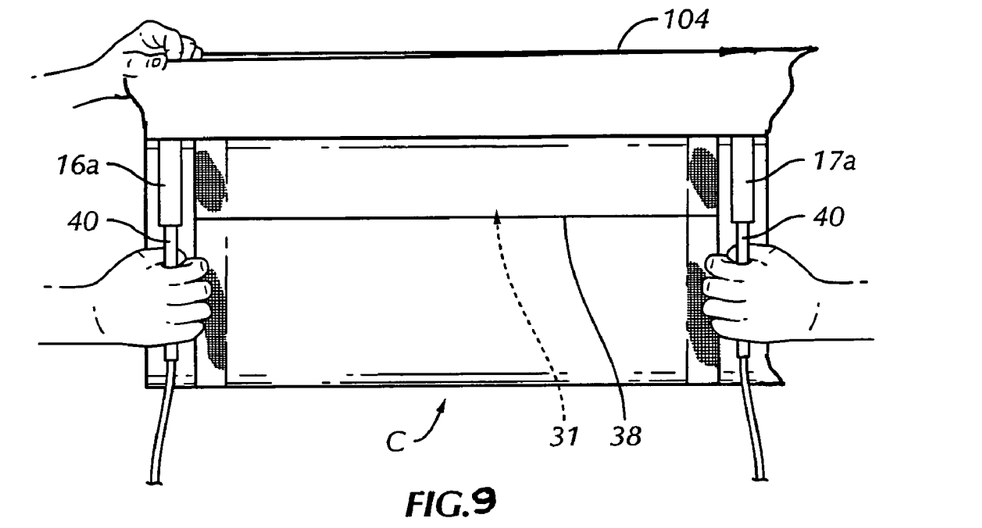
FIG. 9 is a view of the seam sealing strip of FIG. 2 being applied to the joint infill sleeve of FIG. 8 as a completed joint infill shield according to the present invention.
Figure 10:
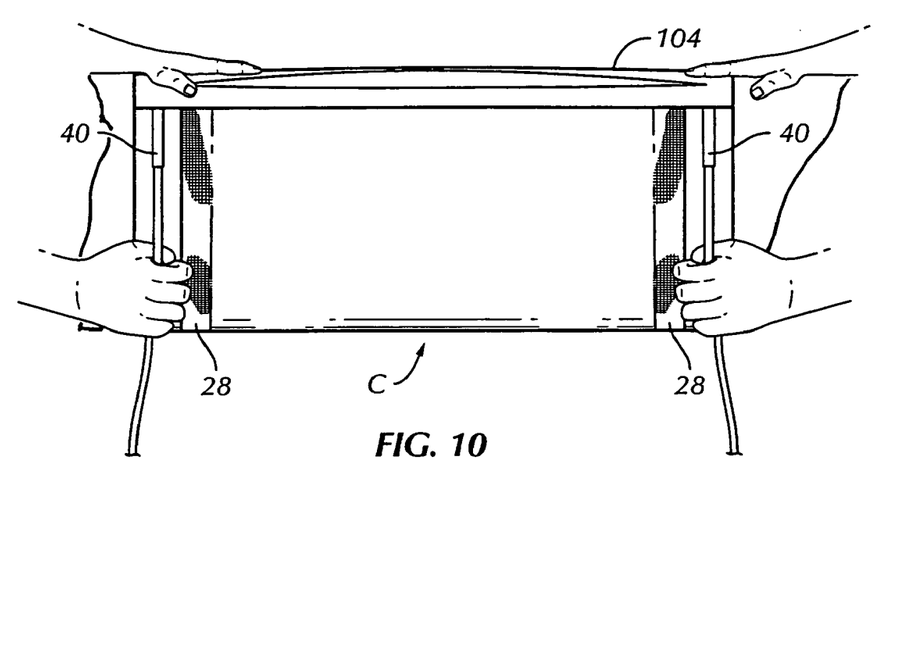
FIG. 10 is a view of electrical connection being made to the seam sealing strip of FIG. 9.

The longitudinal sealing strip 38 is mounted (FIG. 9) on the cladding sleeve C above the seam 31, with the conductive strip 39 on an innermost position. Electrical connection is then made in either of the manners discussed above. A pressure pad, such shown at 104 is mounted, held otherwise secured in place by means of a suitable mechanical clamping system, as described in commonly owned U.S. patent application entitled "JOINT INFILL CLADDING AND METHOD OF APPLYING SAME" Ser. No. 11/231,449, filed of even date herewith, of which applicant is inventor. If desired the clamping system may be automated in a manner similar to the air-impact wrench or hydraulic clamping systems described in such applications, or in some other types suitable for the circumferential welding.

To complete the water impermeable hermetic seal, an injection closure of comparable material to the sleeves and of a size to port form a closure over the injection port 94 is used for closure purposes, as is also described in the commonly owned U.S. patent application Ser. No. 11/231,449 filed of even date herewith and of which applicant is inventor.

Figure 11:
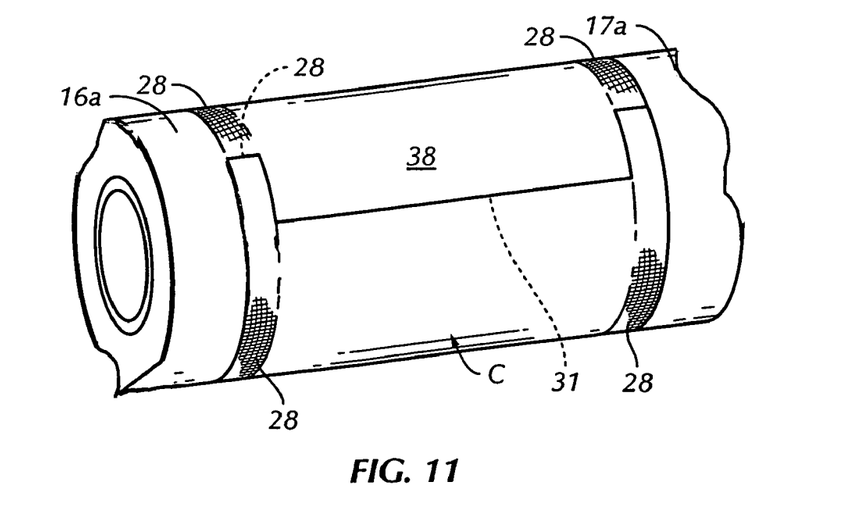
FIG. 11 is a view of a completed joint infill cladding according to the present invention applied to the pipe joint of FIG. 3.

Electrical current is caused to flow through the conductive strip 39 along its longitudinal extent over the seam 31 in cladding sleeve C, and over portions 16a and 17a of the coated portions 16 and 17 adjacent the seam 31 and cladding sleeve C. The conductive strip 39 in a like manner to elements 28 heats and melts the adjacent synthetic resin materials of the sealing strip 38, the cladding sleeve C and the adjacent portions 16a and 17a of the coated pipe. The melted synthetic resin materials bond together, forming a hermetic seal or water impermeable barrier along the longitudinal seam 31 in the cladding sleeve C and also with the adjacent pipe coating (FIG. 11).

Figure 12:
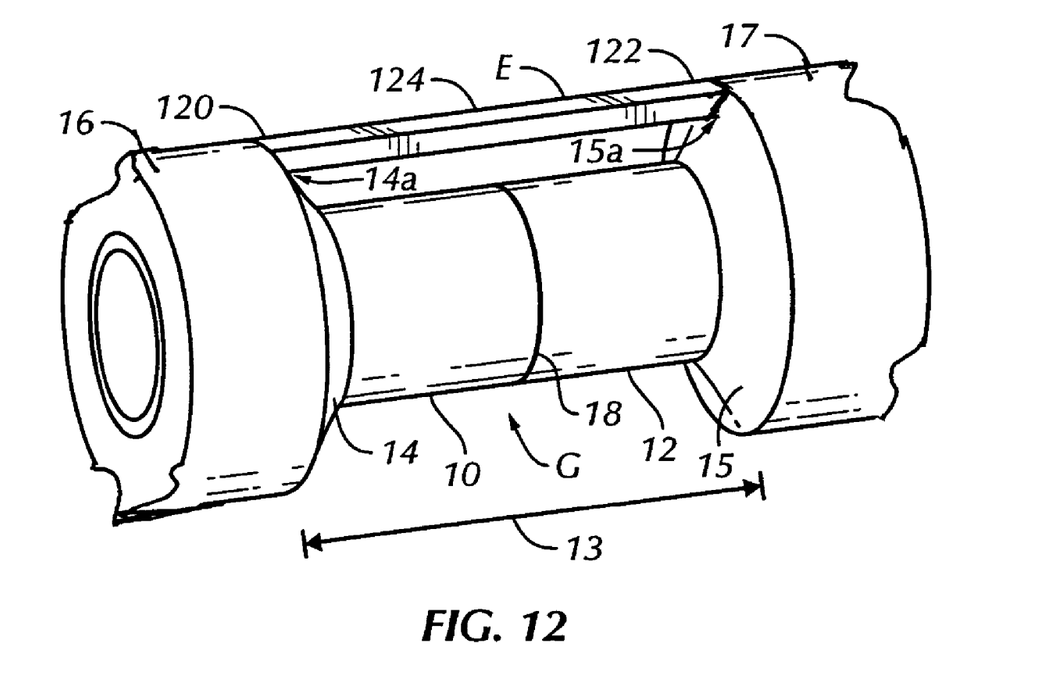
FIG. 12 is an isometric view of an insert element used along the longitudinal seam in the joint infill sleeve in an embodiment of the present invention.

FIG. 12 show an insert element E used as an alternative in place of flap 30f in the sleeve S to block blockage of infill material from the annulus 24 and to thereafter coact with the sealing strip 38. The element E is of a non-conductive, thermally-fusible synthetic resin of a suitable type and takes the form of an elongate beam or bar resting along tapered end portions 120 and 122 on opposite sides of the gap G on coated sections 16 and 17. The element E thus extends in length across the gap G and has outer surface 124 which is located level or flush with that of the outer surface of the coated sections 16 and 17. The insert element E is put into place as shown before mounting the sheet S in position to form the sleeve C.

As mentioned, when using the insert element E it is not necessary for the sheet S to have flap 30f. When the sheet S is put into place, it is located so that the insert element E is located at a position coincident with and along the extent of the longitudinal seam 31. The insert element E is wider than the seam 31, so that with the applicator clamp L engaged, no path for flow or escape, of infill material from seam 31 is present. Further, the thermally fusible nature of the synthetic resin in the insert element E permits it to heat, melt and fuse with the other synthetic resin materials, assisting in formation of the water impermeable barrier for the pipe joint according to the present invention.

According to the present invention, a permanent outer cladding is formed by bonding of the synthetic resin materials together in the manner described above. The cladding sleeve C bonds to the infill I and also to the factory applied portions 16 and 17 of the pipeline P. The infill I also bonds to the factory coated sleeve 30 and also bonds to synthetic resin in the coated portions 16 and 17. The sleeve 30 also bonds to itself along the area of the longitudinal seam 31.

The joint in the pipeline P so formed is thus impermeable to water and in effect a hermetic seal. The joint formed according to the present invention provides an effective, water impermeable seal to the factory applied pipeline coatings and affords better protection for both the joint infill insulation and the pipeline insulation coatings.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of applying protective cladding over welded end portions of coated sections of pipe for a pipeline, comprising the steps of:
   applying a sheet of synthetic resin with electrically conductive elements to form a cylindrical sleeve about the welded end portions, the electrically conductive elements being located on sides of the sheet for circumferential positioning on coated sections of the pipe on each side of a welded end portion of the pipe;
   attaching the electrically conductive elements to a source of electrical current;
   introducing at least one component into the interior of the cylindrical sleeve to allow a synthetic resin to form and fill the interior of the sleeve as joint infill between the adjacent pipe sections;
   sending electrical current into the electrically conductive elements to heat adjacent portions of the cylindrical sleeve to bond together with coated sections and seal the sleeve with the coated sections;
   applying a strip of synthetic resin with an electrically conductive element therewith along a longitudinal seam of the cylindrical sleeve;
   sending electrical current into the electrically conductive clement with the synthetic resin strip to heat the strip to bond the strip to the joint infill, to the sleeve and to the cylindrical seam over the longitudinal sleeve.

2. The method of claim 1, where the coated sections of pipe are insulation coated.

3. The method of claim 1, wherein the coated sections of pipe are weight coated.

4. The method of claim 1, wherein the coated portions of the pipeline are coated with a synthetic resin coating.

5. The method of claim 4, wherein the synthetic resin formed during the step of introducing at least one component bonds with the synthetic resin coating.

6. The method of claim 2, wherein the synthetic resin joint infill comprises a solid polyurethane.

7. The method of claim 2, wherein the synthetic resin joint infill comprises an epoxy.

8. The method of claim 2, wherein the synthetic resin joint infill comprises an elastomer.

9. The method of claim 2, further including the step of:
forming an opening into the synthetic resin sleeve for entry of the components.

10. The method of claim 9, further including the step of:
sealing the opening after the step of introducing components.

11. The method of claim 9, wherein the step of forming the opening in the synthetic resin sleeve is performed after the step of applying the sheet.

12. The method of claim 9, wherein the step of forming the opening in the synthetic resin sleeve is performed before the step of applying the sheet.

13. The method of claim 1, further including the step of:
securing the sleeve in place on the coated sections of pipe with the electrically conductive element attached.

14. The method of claim 1, wherein the synthetic resin sheet has a flap along the longitudinal edge formed in the cylindrical sleeve.

15. The method of claim 14, further including the step of removing the flap prior to the step applying the strip of synthetic resin.

16. The method of claim 1, further including the step of inserting an insert element longitudinally extending between coated sections of the pipe prior to the step of applying a sheet of synthetic resin.

17. The method of claim 16, wherein the step of applying a sheet of synthetic resin includes locating the longitudinal seam of the sleeve along the longitudinally extending insert element.

18. The method of claim 17, wherein the step of sending electrical current heats the strip to bond with the longitudinally extending insert element.

19. The method of claim 1, further including the step of:
forming an opening into the synthetic resin sleeve for entry of the at least one component.

20. The method of claim 19, further including the step of:
sealing the opening after the step of introducing at least one component.

21. The method of claim 19, wherein the step of forming the opening in the synthetic resin sleeve is performed after the step of applying.

22. The method of claim 19, wherein the step of forming the opening in the synthetic resin sleeve is performed before the step of applying.

* * * * *